United States Patent [19]

Byers

[11] 4,072,123

[45] Feb. 7, 1978

[54] DEEP TOWING CABLE AND HANDLING SYSTEM

[76] Inventor: Jimmy F. Byers, Rte. 1, Box 56, Georgetown, Tex. 78626

[21] Appl. No.: 667,315

[22] Filed: Mar. 16, 1976

[51] Int. Cl.$^2$ ............................................. B63B 21/00
[52] U.S. Cl. ..................................................... 114/254
[58] Field of Search ................ 114/235 B, 235 F, 254; 254/134.13 SC; 242/84.8, 86.52

[56] References Cited

U.S. PATENT DOCUMENTS

| 3,347,487 | 10/1967 | Sellen et al. | 242/84.8 |
| 3,347,526 | 10/1967 | Cymmer et al. | 114/235 F |
| 3,630,461 | 12/1971 | Sugasti | 254/134.3 SC |
| 3,712,261 | 1/1973 | McLelland et al. | 114/235 F |

FOREIGN PATENT DOCUMENTS 92,571  11/1968   France ............................. 114/235 F Primary Examiner—Trygve M. Blix
Assistant Examiner—Gregory W. O'Connor

[57] ABSTRACT

A cable and reel handling system for reducing the size of deep towing deck handling equipment is provided. A single drum is used to receive the entire length of a flat tow cable, the drum having a width which is substantially limited to the width of the cable. The drum may be disposed horizontally, vertically or at intermediate angles for either over-the-stern or over-the-side deploying and reeling in. For over-the-stern deploying, the cable is passed through guide rollers and over a traction wheel.

15 Claims, 14 Drawing Figures

DEEP TOWING CABLE AND HANDLING SYSTEM

The present invention concerns marine towing cable and operating equipment and, more particularly, a cable which can tow a vehicle to depths on the order of 3,000 ft. without fairing.

Towing cable systems presently used on surface ships generally are arranged for mounting on the fantail of the ship and, for deep towing such as towing of sonar equipment, require a large portion of deck space. These systems are so heavy as to limit their use to large vessels because of the excessive on-deck weight required. In order to tow a 5,000 lb. vehicle 600 ft. deep, a hoist assembly weighing 30,000 to 40,000 lbs. is necessary. The storage drum for such a cable, which conventionally is cylindrical in cross section, is typically 5 ft. in diameter and 6 ft. wide. For the same vehicle weight and tow cable with sectional fairing, the width of the drum for towing to 3,000 ft. is substantially 16 ft. Fairing is required to reach the 3,000 ft. depth at even moderate ship speeds.

Other disadvantages of conventional tow cable and fairing systems are that sectional fairing is made and applied in individual sections which are usually less than a foot long, the trailing edges of adjacent fairings must be pinned together to prevent excessive relative rotation of the sections, with haired fairing a loss of fairing results from the tow cable cutting the fairing between the cable and drum and between adjacent tow cable layers, and the use of any fairing requires an excessive length of tow cable to reach depths on the order of 2,000 ft. In addition, the sectional fairing is wound in a single layer on a drum arrangement which introduces a large vertical moment that affects ship stability. The center of gravity of a typical drum arrangement is 5 ft. above the deck and the hoist weight is approximately 40,000 lbs. These and other limitations of conventional tow cables such as cost are overcome by the flat cable and handling system of the present invention which operates to reduce the storage drum size and to provide a lower drag cable that will allow deeper towing at higher surface ship speeds.

Accordingly, it is an object of the present invention to provide a cable and cable handling system for deep towing operations which reduces the deck area required as well as the moment of the entire unit.

Another object of the invention is to provide a cable and reel handling system which incorporates a tow cable and a fairing in a single unit which may be wound upon a single drum.

A further object of the invention is to provide a cable and reel handling system for deep towing operations wherein the tow cable is stored on a single drum which may be disposed horizontally, vertically or at intermediate angles for either over-the-stern or over-the-side deploying and reeling in.

Other objects, advantages and novel features of the invention will become apparent from the following detailed description thereof when considered in conjunction with the accompanying drawings in which like numerals represent like parts throughout and wherein.

The invention, in general, concerns an improved deep sea towing configuration and technique that utilizes a flat tow cable which is wound upon itself on a single disc-like drum. This arrangement permits the use of a tow drum which is only slightly wider than the tow cable width, significantly reducing the moment of rotating mass and thereby increasing ship stability as well as conserving valuable deck space. A continuous fairing may be made integral with the cable and accommodated for in storage by simply extending the width of the storage drum. The cable components are arranged linearly with the strength members contained in the forward portion of the flat cable and the electrical conductors contained in the protected aft portion of the cable. The cable is deployed over the stern via being rotated 90° from a horizontal storage drum position by guide rollers so that is may pass over a traction wheel in a horizontal attitude. Additional guide rollers aft of the traction wheel rerotate the cable 90° to the towing configuration in which the strength members are adjacent the leading edge of the cable.

Figure 1:
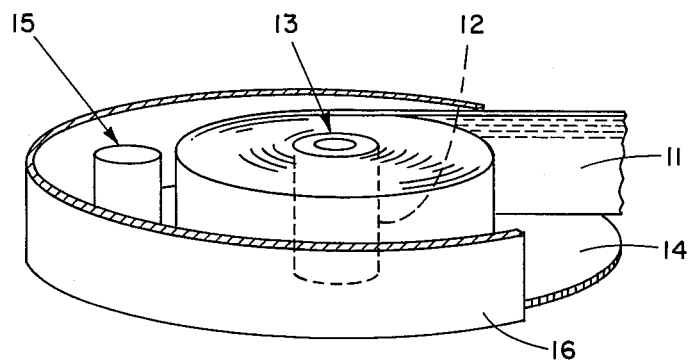
FIG. 1 is a perspective view partly in section of the tow cable and drum of the present invention.
Figure 2:
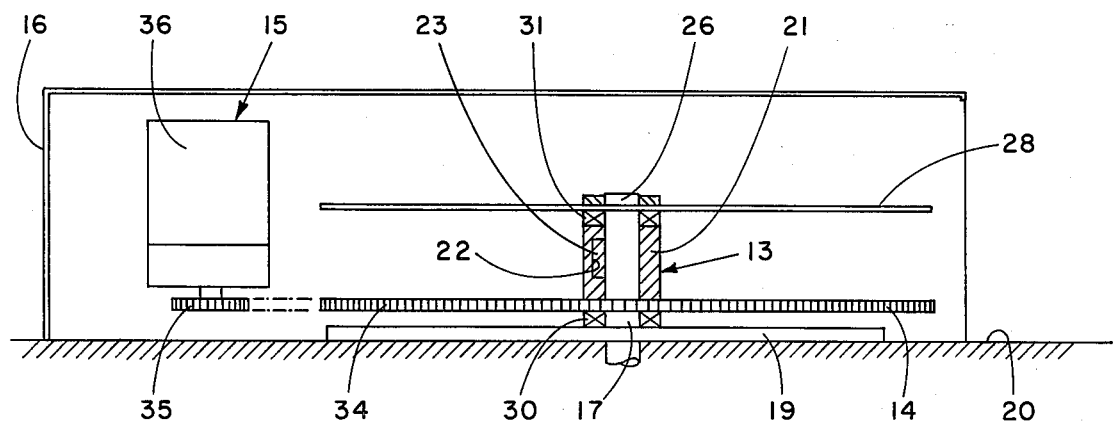
FIG. 2 is a sectional view of the drum and drum operating mechanism of the embodiment of FIG. 1.

Referring to the drawings, FIG. 1 presents a schematic view of the invention which includes a flat tow cable 11 which is wound about an inner drum face 12 of a drum assembly 13 and rests upon a flange 14 which is driven by a motor and gear box assembly 15. Flange 14 is varied in diameter to accommodate the desired length of cable, with the cable wound in an enclosure which includes a cover 16 of which only the side is shown. FIG. 2 is a sectional view of the cable and reel arrangement and shows the entire assembly mounted on a non-rotating vertical support shaft 17 that is supported in a deck mounting plate 19 which in turn is secured to a deck surface 20 by conventional means not shown. A drum 21 is provided with an opening 22 to receive the end of a cable which is indicated at 23. Drum 21 is mounted over a slip ring 26, and the cable is disposed between driven flange 14 and a top flange 28, the flanges rotating upon respective sets of roller bearings 30 and 31. The drum assembly and drive means are contained within cover 16. In the embodiment shown, flange 14 is in effect a sprocket wheel and is driven via a chain 34 and a satellite sprocket wheel 35 by a motor 36.

Figure 3:
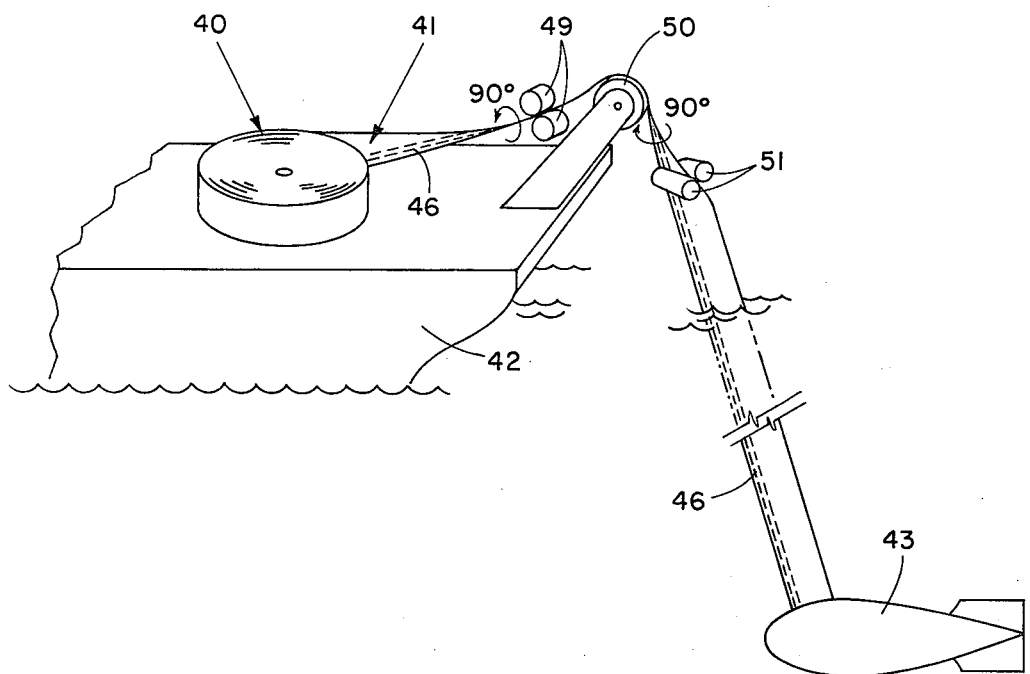
FIG. 3 is a schematic diagram showing the basic components of the invention towing a deep submergence vehicle.
Figure 4:
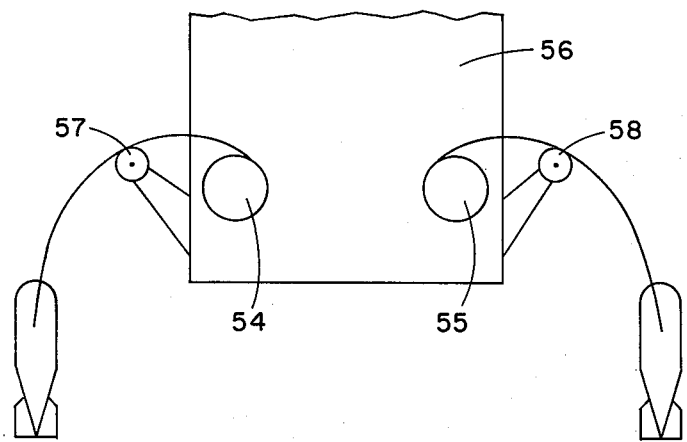
FIG. 4 is a schematic plan view showing an alternate deck position for towing a deep submergence vehicle.

FIG. 3 is a schematic arrangement showing the procedure for deploying a tow cable from its drum into a towing attitude. A flat reel of cable 40, initially containing the entire length of a tow cable 41, is mounted adjacent the stern of a surface vessel 42 and, after being secured to a vehicle 43 to be towed, is passed over the stern of the vessel in such a manner as to present one edge of the cable to be the leading edge during towing. In this embodiment, cable 41 is formed internally in a manner to be described later so as to contain strength members indicated at 46 along one edge. The bottom edge of the cable as wound on the reel is, in this embodiment, the edge which must be the leading edge during towing operations. Cable 41 is placed in the desired towing attitude by first passing between a pair of athwartships disposed rollers 49 for turning the cable 90° in a clockwise direction facing aft so that it may pass over a traction reel 50 without distortion and, thereafter, is passed between a second pair of guide rollers 51 which cause the cable to be rotated 90° counterclockwise so as to position strength members 46 in the leading edge of the cable. FIG. 4 illustrates an alternate deploying means wherein flat cables may be stored in horizontally disposed reels 54 and 55 and paid out on either side of a surface vessel 56 by means of a pair of traction wheels 57 and 58 and other conventional equipment such as shown in FIGS. 1 and 2 for over-the-side towing. In such towing, there is no need for rollers to rotate the cable, however, it may be desirable to position guides between the reels and the traction wheels to achieve desired control in paying out of the cable.

Figure 5:
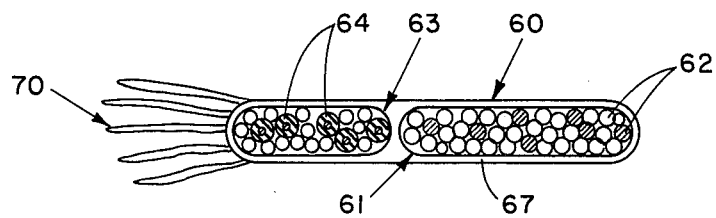
FIG. 5 is a sectional view of one embodiment of tow cable of the present invention.
Figure 6:
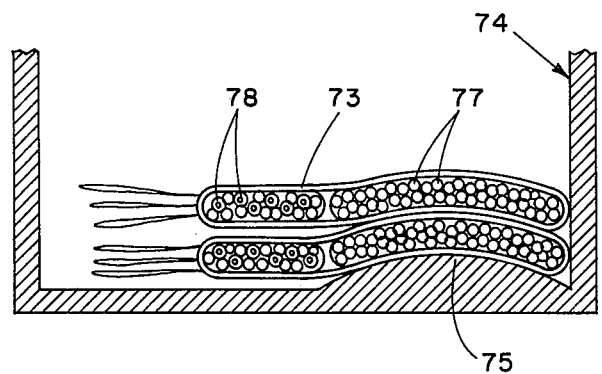
FIG. 6 is a sectional view of a drum containing the cable embodiment of FIG. 5.
Figure 7:
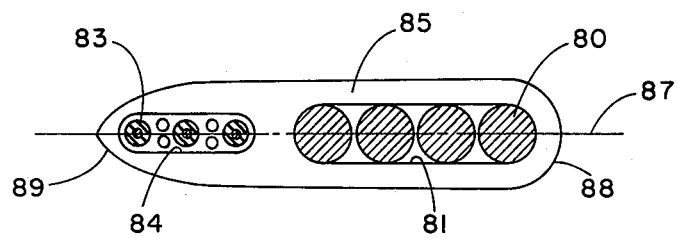
FIG. 7 is a sectional view of an alternate embodiment of tow cable.
Figure 8:
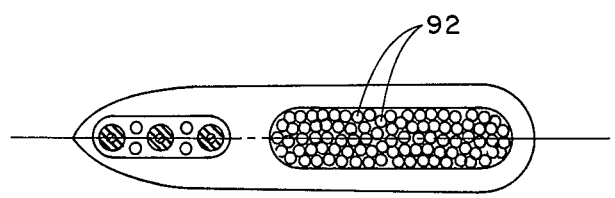
FIG. 8 is a sectional view of a further embodiment of tow cable.
Figure 9:
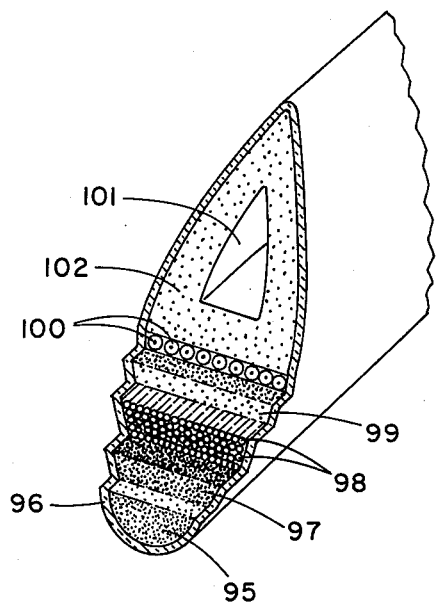
FIG. 9 is a perspective sectional view of a still further arrangement of components in the tow cable of the present invention.

The flat tow cable of the invention may be formed as shown in FIGS. 5-9 which disclose the manner in which various components of the cable may be disposed in flat cables. In FIG. 5, a flat cable 60 is shown which contains a plurality of strands which may be made of either wire or plastic and which preferably are embedded in plastic to form a flat bundle 61. A second flat bundle 63 containing a plurality of electrical conductors 64 is disposed adjacent to and in alignment with bundle 61 within an outer plastic cable covering 67 which preferably is formed of plastic and fabric layers. If desired, a fairing 70 may be formed in cable 60 when the outer configuration is made to permit the maximum towing depth to be attained. Fairing 70 may be formed of ribbon or round or tufted individual strands of fairing. FIG. 6 illustrates a preferred arrangement for storing a cable 73 in a pulley or drum body 74. In this embodiment, drum body 74 is provided with an annular convex area indicated at 75 so as to contour cable 73 in such a manner as to place the strength members, such as a plurality of wires or strands 77, in compression and a plurality of electrical conductors 78 disposed in line with strength members 77 under no load. FIG. 7 illustrates an alternate form of flat cable construction wherein the strength members are enlarged round wires 80 which are contained in a forward section 81 of the cable and the electrical conductors indicated at 83 are contained in an aft section 84 of the cable. The cable thickness in this embodiment, indicated at 85, is formed of a preferably transparent nylon coating so as to permit ready inspection of the inner cable and seal out moisture, dust, etc. The coating is provided with a selected stiffness by potting or other conventional means so as to minimize cable flutter. The neutral bending axis when wound on a pulley or drum is indicated at 87 and the cable is formed with streamlined contoured leading and trailing edges indicated at 88 and 89 respectively to reduce drag. The embodiment of FIG. 8 is essentially the same as that of FIG. 7 with flat wire rope strength members indicated at 92 being substituted for the enlarged round strength members 80. In the embodiment of FIG. 9, a streamlined composite embodiment is provided wherein a low compression member 95 is inserted adjacent the leading edge of an outer cover 96, a high compression member 97 is positioned adjacent low compression member 95, a plurality of strength member 98 which may be steel or plastic strands are positioned adjacent the high compression member, and an insulating member 99 separates the forward portion of the cable from a plurality of electrical conductors 100. The electrical conductors may be multiple strand copper with surface coatings and insulation suitable for either data or power conductors. Outer shields, jackets, and water blocking may be constituted of any of the materials normally used for these purposes. It is desirable to embed each conductor in a soft plastic material that will minimize mechanical movement of the electrical strands of the conductor and also expansion and contraction of the cable as it is transferred from a ship deck at e.g. 130° F. to the ocean at e.g. 30° F. There are numerous materials such as silicone rubber, nitrile rubber, plastic compounds, etc. that would meet these requirements.

The hoist frame, tow drum, and associated hoist materials may be constituted of any of those materials that are presently employed for these purposes. These materials include stainless steels, aluminum, bronzes, and structural steel. Various relatively new plastic materials may be used. Several plastic materials presently used for slip ring bearings to prevent mechanical and electrical noise at the slip ring contact are appropriate for use in the invention.

Any electrical or hydraulic motor constructed for open deck use may be employed, however, if a constant tension or bottom following feature is desired, servo-type motors should be used. A void 101 is provided in the trailing edge which is formed of a second low compression member 102 in a sufficient thickness to provide added flexibility and yet substantially maintain cable shape at all towing speeds and depths.

Figure 10:
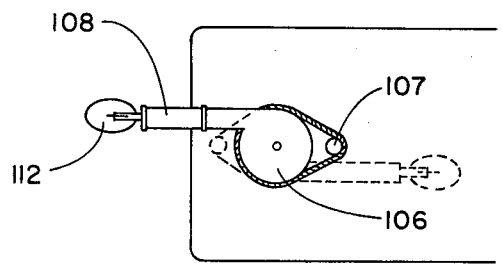
FIG. 10 is a schematic plan view showing the cable of the present invention in a stowed position on the deck of a surface vessel.
Figure 11:
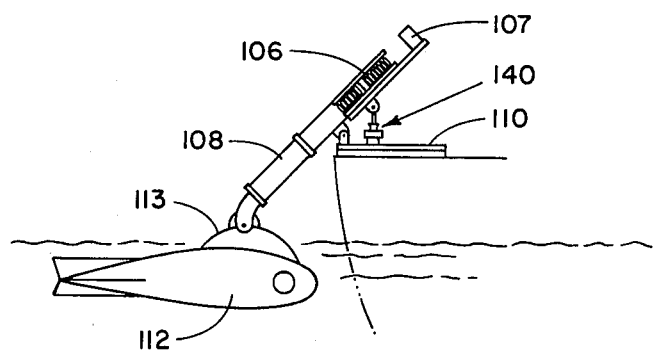
FIG. 11 is a side view of the components shown in FIG. 10 disposed in a position suitable for launching and recovery of a towed vehicle.
Figure 12:
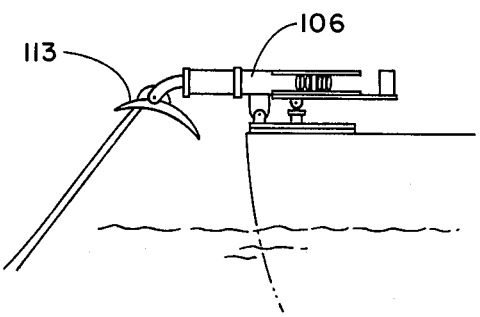
FIG. 12 is a schematic side view showing the components of FIG. 10 in the running position.
Figure 13:
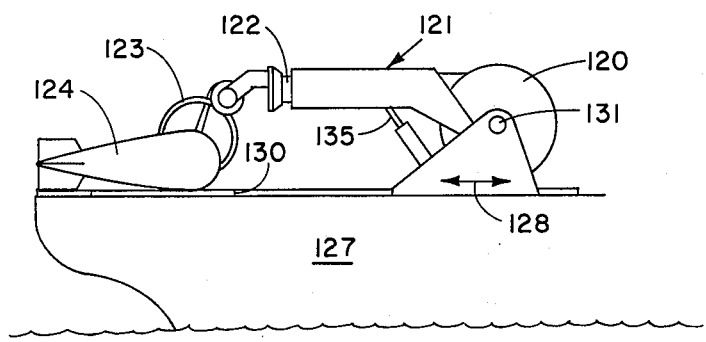
FIG. 13 is a schematic side view of an alternate flat cable stowage and handling means wherein the reel drum is mounted vertically.

FIG. 10-12 illustrate an alternate arrangement for stowing and deploying a flat cable from a horizontal movable flat cable drum 106. In FIG. 10, reel 106 is shown in phantom in the stowed position and in full line in an operable position. This embodiment includes a motor and brake assembly 107, an extendable arm 108 and a rotating platform 110 which is shown in FIG. 11. A towed vehicle 112 is connected to a bridle 113, with FIG. 11 also showing the assembly tilted in the position used in launch and recovery of the towed vehicle. FIG. 12 shows the assembly in the run position wherein cable drum 106 is horizontally disposed. FIG. 13 shows an alternate handling method and means wherein a cable drum or reel 120 is mounted in a vertical attitude and is secured in a hoist assembly 121 which includes an extendable arm 122 and a bridle 123 connected to a vehicle to be towed 124. The entire unit is mounted on the deck of a surface vessel 127 and adapted to be moved horizontally as indicated at 128 so that the assembly may be stowed in the position shown in FIG. 13 and the towed vehicle may be deployed by sliding the assembly aft in a conventional manner to a stop position indicated at 130. Hoist 121 is rotatable about the transverse axis of cable reel 120, indicated at 131, by a hydraulically operable arm 135.

Figure 14:
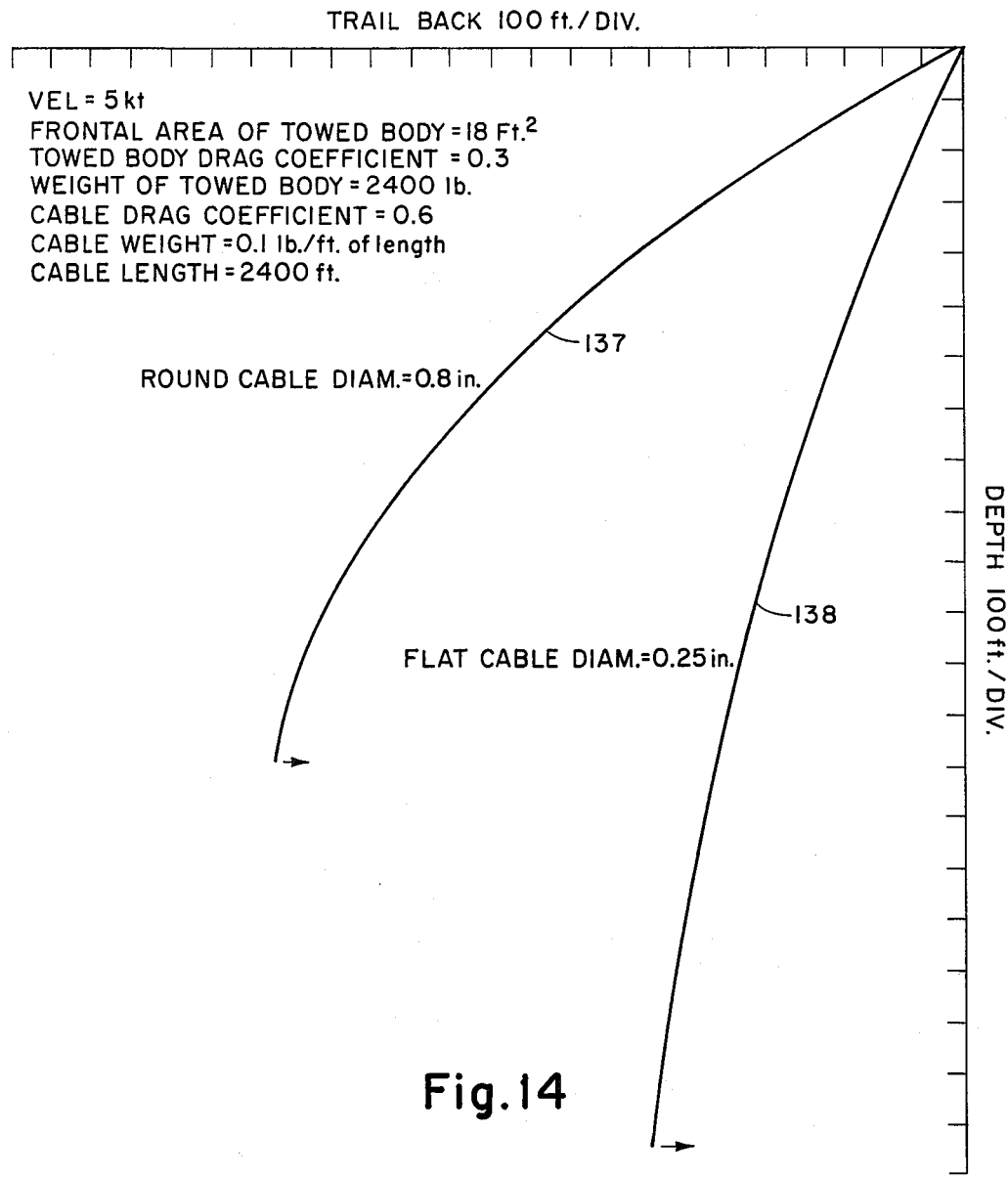
FIG. 14 is a graph illustrating the lengths of round versus flat cable required to achieve selected depths.

The graph of FIG. 14 illustrates the depths which may be achieved using a round cable 137 having a diameter of 0.8 inch versus the much greater depth achieved by a flat cable 138 of the same length having a major thickness of 0.25 inch. This graph demonstrates one advantage of a thin profile cable, i.e. a reduction in the water drag on the cable by a minimum of a factor of 4. Such a reduction permits the towed vehicle to reach a much greater depth than that achieved using a faired circular cable. For substantially identical towed bodies. i.e. as to geometry, weight and size, the maximum depth of the towed body for both the round and flat cables is limited by the same physical variables: weight per unit length of the cable, the frontal area of the cable, the lift of the cable, the angle of attack of the cable, and the towing speed. The depth of the towed body for both cables is limited by the above physical variables which are nonlinearly related, therefore, it seems to be apparent that the depth of a body towed with a flat cable far exceeds the depth achievable with the same length of a round cable. All comparisons of round and flat cables herein assume comparable breaking strength and number and size of electrical conductors.

One of the major advantages of the flat cable is the small trail back and a very small amount of cable curvature. These two characteristics are limiting factors when operating in a bottom following mode, i.e. the towed body is required to maintain a fixed height above bottom. As the bottom slope and roughness change, the hoist drive has less tow cable to reel in or out to compensate for this change. Also, there is a very major advantage when the surface ship stops. The smaller trail back will require a significantly smaller amount of cable length to be reeled in to prevent the towed body from crashing into the ocean bottom. Again, the very high flat cable hoisting speeds become a predominant factor in preventing the towed body from hitting the ocean bottom.

The operation of the various embodiments is believed to be substantially self-explanatory. FIGS. 1 and 2 present the operative details of a reel or drum for stowing a flat tow cable, with motor-brake assembly 15 providing the mechanical force required for both deploying and hauling in a tow cable. The diameter of drum 14 is variable depending upon cable thickness and the depth to be reached. The height or width of drum 14 is variable with each cable configuration and the contour of the inner drum face, 75 in FIG. 6, may be varied to accommodate tow cables having varied strength members and thicknesses of outer sheath. It will be appreciated that the contour indicated at 75 would not be required for the cable configuration of FIGS. 7-9.

The means for deploying the cable are shown in FIGS. 3, 4 and 10-13 and include essentially conventional equipment such as guide rollers 49 and 51, traction wheels 50, 57 and 58 and hoist 121. Guide rollers are required when deploying a cable from a horizontally disposed reel over the stern but are not essential where the cable is deployed from a horizontally disposed reel over the side of a surface vessel. In the embodiment of FIG. 10, the assembly is moved from the operable position shown in full line to the stowed position by merely releasing stops, not shown, which conventionally are required to steady the equipment, and rotating the entire unit about the vertical axis of drum 106. This is shown more clearly in FIG. 11. The embodiment of FIGS. 10-12 is tilted by a conventional piston actuated rod which is indicated at 140 and which is shown in side elevation in the horizontal position in FIG. 12.

The tow cable can be configured as shown in FIGS. 5-9, and the number of round strength members and electrical conductors can be varied depending upon the desired application. The strength members may be either metal or plastic and may be exposed or embedded in a plastic or rubber fairing. Dupont PBR-40 having a breaking strength of 500,000 psi is very suitable for such an application. A composite woven section similar to V-belt construction, not shown, would provide a high strength corrosion resistant strength member. The drum drive can be worm gear, spur gear, roller chain, or herringbone gears such as are used in flat reels for ore mining lifts because of their high power-to-size load transmission. Either hydraulic or electric motors may be used for the prime power source in the various embodiments. The sheave or traction wheel crown is appropriately contoured to accommodate cable alignment in the same manner as is done with flat belt pulleys.

The flat storage drum of the present invention permits longer lengths of tow cable to be stored in a smaller space on the deck of a surface vessel. For example, a 2400-ft. length of cable can be stored in a drum having a diameter of 8 ft. and a height of 8 inches. The lower profile and the vertical dimension of the flat storage drum vs. the conventional cylindrical drum produce a smaller instability moment than that of the large conventional cylindrical drums and, in addition, permit the use of the deck space occupied by the flat storage drum through the installation and use of a reel cover as working space. The reduction in instability moment is due to the center of gravity of the flat drum or reel being lower than that of the large cylindrical drum conventionally used for circular cable storage. For example, approximately 200,000 ft.-lb. of vertical moment can be saved by substituting a flat cable and drum for a comparable length of circular cable.

The weight savings achieved by the use of flat tow cable allow either an additional load to be carried by a surface vessel or a smaller vessel to be used. The flat drum or reel permits utilization of a continuously faired tow cable in contrast to the difficulty in storing a cylindrical cable having short sections of fairing attached which have been found to lay flat on the drum face, resulting in damage to the fairing and difficulty in handling the faired cable.

One form of flat cable made according to the present invention is a conventional mine skip cable having a thickness of ¼ inch an a width of ½ inches. The strength member of such a cable is plow steel with a breaking strength of 16.8 tons and a weight of 0.69 lb/ft. In such a cable, the strength member is utilized for deep towing operations.

The thin profile cable of the present invention is also advantageous in that it reduces the water drag on the tow cable by at least a factor of 4. This permits a towed vehicle to reach a greater depth when using the flat cable than can be achieved using a faired circular cable. For example, the drag effect is equivalent to 1/5 the length of a flat cable so that a towed vehicle can descend to a depth of 1900 ft. with 2400 ft. of flat tow cable. A circular cable, however, would limit the same towed vehicle to a depth of only 1600 ft. no matter how much cable is reeled out.

A further advantage of the flat tow cable and flat drum or reel is a significant reduction in the weights of the rotating components of an assembly. Higher tow line velocities, e.g. to 3000 ft/min., may be utilized whereas in the case of cylindrical drums for circular cables these speeds are not normally acceptable due to the larger drums mass which imposes large torques on the drive trains and motors. With the flat components, the acceleration of the drum can be a factor of 10 higher than that of a drum for circular cable. This permits the use of either a smaller drive motor or a greater speed of response where a larger motor than required is used.

A major advantage of the flat components is that heavier loads may be hoisted and towed at deeper depths. This is because circular cable requires a larger diameter inner drum surface on which it is wound while flat cable needs a drum only slightly wider than the width of the cable since the cable is wound on itself.

The flat cable technique combines flexibility and great strength, making possible the use of simple and compact hoist machinery which produces considerable savings in initial cost, maintenance, spare parts and operating power.

Obviously many modifications and variations of the present invention are possible in the light of the above teachings. For example, because of the reduced power limitations achieved the assembly hoist may be automated by use of a servo or other automatic drive. Also, either fixed arm supports or a rotatable platform may be used to retrieve a towed vehicle. In those embodiments including the horizontal movable flat reel configuration, the weight of the hoist machinery may be balanced on a rear pivot. The tilt arm or cylinder in these embodiments may also serve as a shock absorber.

What is claimed is:

1. A deep towing cable and handling system therefor comprising:
   a towing cable having a substantially rectangular cross section whose short dimension is on the order of from ¼ to 1/7 of the long dimension;
   a drum containing said cable,
   said drum mounted horizontally on the deck of a vessel for rotation about a vertical axis so as to present as small as possible a moment acting to decrease the stability of the vessel.
   said cable wound on said drum in a single lay per layer winding;
   means for mounting, braking and rotating said drum on a vessel; and
   means for deploying said cable over the sides or stern of a surface vessel in a towing attitude,
   said means for deploying including first guide means positioned aft of said drum for rotating said cable to a horizontal attitude, traction means positioned over the stern of the vessel and aligned with said first guide means for deploying said cable over the stern of the vessel, and second guide means positioned outboard of the vessel and aligned with said traction means and said first guide means for rotating said cable into a towing attitude.

2. The cable and handling system of claim 1 and further including a plurality of strength members and a plurality of electrical conductors in said cable,
said cable arranged internally to accommodate separately said strength members and said electrical conductors,
   said strength members positioned adjacent the leading edge of the deployed cable and said electrical conductors positioned adjacent the trailing edge of the deployed cable.

3. The cable and handling system of claim 2 wherein said drum includes an annular face at the core thereof upon which said cable is wound,
   said face annularly deformed proximate to the strength members so as to place said strength members in compression and said electrical conductors under no load when wound on said drum.

4. The cable and handling system of claim 3 wherein said strength members and said electrical conductors are arranged in separate bundles in said cable.

5. The cable and handling system of claim 4 wherein said cable is made of fabric layers forming in a cross section parallel sides and rounded ends and said bundles are contained within sheaths longitudinally spaced in the interior of the cable.

6. The cable and handling system of claim 5 wherein said strength members are a plurality of strands of wire rope.

7. The cable and handling system of claim 5 wherein said strength members are a plurality of strands of plastic rope.

8. The cable and handling system of claim 4 wherein said cable is made of extruded plastic and said strength members and said electrical conductors are disposed in respective compartments formed integrally in said plastic.

9. The cable and handling system of claim 8 wherein said strength members are on the order of from 3 to 6 enlarged round wires.

10. A method of achieving deeper towing depths of towed submersibles and reducing the upsetting moment caused by towing equipment carried on the decks of surface vessels comprising:
    deploying internal components of a flat tow cable in a linear arrangement and presenting the narrow dimension of the cable to the environment;
    storing the cable in a horizontally disposed flat drum on the deck of the vessel so as to reduce the upsetting moment of the assembly;
    deploying the cable from the horizontally disposed drum by rotating the cable 90° so as to pass over the stern in a horizontal attitude and reverse rotating the cable 90° so as to enter the medium in a fore and aft towing attitude; and
    isolating electrical conductors in said cable from strain by strengthening the leading portion of the cable and placing the electrical conductors in the trailing portion of the cable.

11. A towing system for achieving deeper towing depths of towed submersibles and reducing the upsetting moment caused by towing equipment carried on the decks of surface vessels comprising:
    a substantially flat tow cable and a drum for storing said cable in a single winding with respect to cable width thereon;
    means for mounting said drum horizontally on the stern deck of a surface vessel;
    means for braking and rotating said drum;
    means including a rotatable platform for deploying said cable over the sides or stern of a surface vessel in a towing attitude and rotating said drum from a stowed position to a launch and recovery position and return to the stowed position wherein the narrow dimension of the cable is substantially parallel to a vertical ship's plane containing the centerline of the vessel;

said cable formed of an outer resilient cover and lengthwise internal components extending across the cable from leading to trailing edge and including in succession a first low compression member for receiving stress and shock, a high compression member for maintaining cable shape, a plurality of strength members for towing, an electrical insulating member for isolating electrical conductors, a plurality of electrical conductors, and a second low compression member, said second low compression member occupying a substantial portion of the cable interior and containing a central void formed by walls of sufficient thickness to increase cable flexibility while substantially maintaining cable shape at all towing speeds and depths;

an extendable arm secured to said drum for extending the release point of the cable over the side of the vessel during launch, run, and recovery; and means for tilting said drum to facilitate launch and recovery of towed submersibles, said drum returned to and maintained in a horizontal attitude during towing operations, said means for deploying including first guide means positioned aft of said drum on the towing vessel deck for rotating said cable from its stowed vertical attitude to a horizontal attitude, traction means positioned over the stern of the vessel and aligned with said first guide means for deploying said cable over the stern of the vessel, and second guide means positioned outboard of the vessel and aligned with said traction means and said first guide means for rotating said cable into a towing attitude.

12. The towing system of claim 11 wherein said cable includes a plurality of strength members positioned in the forward portion of the deployed cable and a plurality of electrical conductors positioned in the aft portion thereof so as to substantially reduce or eliminate mechanical loads on said electrical conductors.

13. The towing system of claim 12 wherein said strength members and conductors are arranged in separate bundles in said cable and said drum is provided with an annularly deformed area proximate said strength members to place said members in compression and said conductors under no load when wound on said drum.

14. The towing system of claim 13 wherein said cable is made of fabric layers forming in a cross section parallel sides and rounded ends and said bundles are contained within sheaths longitudinally spaced in the interior of the cable.

15. The towing system of claim 14 wherein said strength members are a plurality of strands of wire rope.

* * * * *

UNITED STATES PATENT OFFICE
CERTIFICATE OF CORRECTION

Patent No. 4,072,123        Dated February 7, 1978

Inventor(s)   Jimmy F. Byers

It is certified that error appears in the above-identified patent and that said Letters Patent are hereby corrected as shown below:

On The Title Page insert:

-- [73] Assignee: The United States of America as represented by the Secretary of the Navy --.

Signed and Sealed this

Thirteenth Day of June 1978

[SEAL]

Attest:

RUTH C. MASON
*Attesting Officer*

DONALD W. BANNER
*Commissioner of Patents and Trademarks*